(12) United States Patent
Schneider

(10) Patent No.: US 10,079,569 B1
(45) Date of Patent: Sep. 18, 2018

(54) ROOF SYSTEM FOR PRODUCTION OF ELECTRICAL POWER

(71) Applicant: BlueScope Buildings North America, Inc., Kansas City, MO (US)

(72) Inventor: Michael Aaron Schneider, Lenexa, KS (US)

(73) Assignee: Bluescope Buildings North America, Inc., Kansas City, MO (US)

( * ) Notice: Subject to any disclaimer, the term of this patent is extended or adjusted under 35 U.S.C. 154(b) by 0 days.

(21) Appl. No.: 15/625,303

(22) Filed: Jun. 16, 2017

(51) Int. Cl.
| | |
|---|---|
| *E04D 13/18* | (2018.01) |
| *E04H 14/00* | (2006.01) |
| *H02S 20/23* | (2014.01) |
| *F24J 2/52* | (2006.01) |
| *H02S 30/10* | (2014.01) |
| *F24S 25/00* | (2018.01) |
| *F24S 25/615* | (2018.01) |

(52) U.S. Cl.
CPC ............. *H02S 20/23* (2014.12); *F24J 2/5201* (2013.01); *F24J 2/5249* (2013.01); *F24S 25/00* (2018.05); *F24S 25/615* (2018.05); *H02S 30/10* (2014.12)

(58) Field of Classification Search
CPC ......... F24J 2/5201; F24J 2/5249; H02S 20/23
See application file for complete search history.

(56) References Cited

U.S. PATENT DOCUMENTS

| | | | |
|---|---|---|---|
| 5,409,549 A * | 4/1995 | Mori | ................. E04D 3/366 136/244 |
| 7,997,779 B2 | 8/2011 | Futami | |
| 8,065,838 B2 | 11/2011 | Hockman | |
| 8,314,324 B2 | 11/2012 | Tell et al. | |
| 8,607,510 B2 | 12/2013 | Daniels | |
| 8,714,768 B2 | 5/2014 | Tittle | |
| 9,011,034 B2 | 4/2015 | Liu et al. | |
| 9,027,289 B1 * | 5/2015 | Burtt | ................. H02S 20/23 126/621 |
| 9,057,195 B2 | 6/2015 | McPheeters | |
| 9,086,185 B2 * | 7/2015 | Haddock | ................. F16M 13/02 |
| 9,145,685 B2 | 9/2015 | Stapleton | |
| 9,385,255 B2 | 7/2016 | Wiedeman et al. | |
| 2003/0005954 A1 | 1/2003 | Emoto et al. | |

(Continued)

FOREIGN PATENT DOCUMENTS

| | | |
|---|---|---|
| CN | 204131454 | 1/2015 |
| EP | 1744372 A2 | 1/2007 |
| WO | 2007142515 A1 | 12/2007 |

OTHER PUBLICATIONS

David, My Flexible Thin Solar Panel Setup, http://www.thesamba.com/vw/forum/viewtopic.php?p=7997779, dated Jun. 7, 2015, 14 pages.

(Continued)

*Primary Examiner* — Brian D Mattei
(74) *Attorney, Agent, or Firm* — Lathrop Gage L.L.P.

(57) ABSTRACT

A roof system for production of electrical power from solar energy including a roof with laterally disposed longitudinally extending standing seams and brackets secured to the laterally disposed standing seams. The roof system includes a backer panel with an upper surface and a lower surface, wherein the backer panel extends between and is secured to the brackets forming an arch shaped backer panel configuration. A thin film solar panel is secured to the upper surface of the arch shaped backer panel.

24 Claims, 6 Drawing Sheets

(56) References Cited

U.S. PATENT DOCUMENTS

| | | | |
|---|---|---|---|
| 2007/0295388 A1 | 12/2007 | Adriani et al. | |
| 2010/0294343 A1* | 11/2010 | Wexler | F24J 2/5237 |
| | | | 136/251 |
| 2012/0024283 A1* | 2/2012 | Skillman | F24J 2/50 |
| | | | 126/708 |
| 2013/0160824 A1* | 6/2013 | Khouri | H01L 31/048 |
| | | | 136/251 |
| 2013/0299657 A1* | 11/2013 | McPheeters | E04D 13/1476 |
| | | | 248/237 |
| 2013/0340826 A1 | 12/2013 | Yan | |
| 2014/0167677 A1 | 6/2014 | Voelkner | |
| 2014/0196769 A1* | 7/2014 | Schoop | H01L 31/048 |
| | | | 136/251 |
| 2014/0261638 A1* | 9/2014 | Haddock | H02S 20/00 |
| | | | 136/251 |
| 2015/0075587 A1* | 3/2015 | Veloso | F24J 2/5237 |
| | | | 136/251 |
| 2016/0261228 A1 | 9/2016 | Kanbara et al. | |
| 2017/0093328 A1* | 3/2017 | Wylie | H02S 20/23 |
| 2017/0338768 A1* | 11/2017 | Prakash | H02S 20/23 |

OTHER PUBLICATIONS

Alternative Energy, How Do Solar Panels Work?, https://web.archive.org/web/20160609153551/http://www.altenergy.org/renewables/solar/solartechnolgy.html, dated Jun. 9, 2016, 5 pages.

Global Solar, Flexible Solar Panels, Power the Possibilities, http://www.globalsolar.com/, dated Aug. 16, 2017, 3 pages.

Dumont Power, SoloPower Flexible, http://www.dumontpower.com/content/solopower-flexible, dated Aug. 16, 2017, 5 pages.

PCT Application No. PCT/US18/37626, International Search Report and Written Opinion, dated Jul. 23, 2018, 6 pages.

* cited by examiner

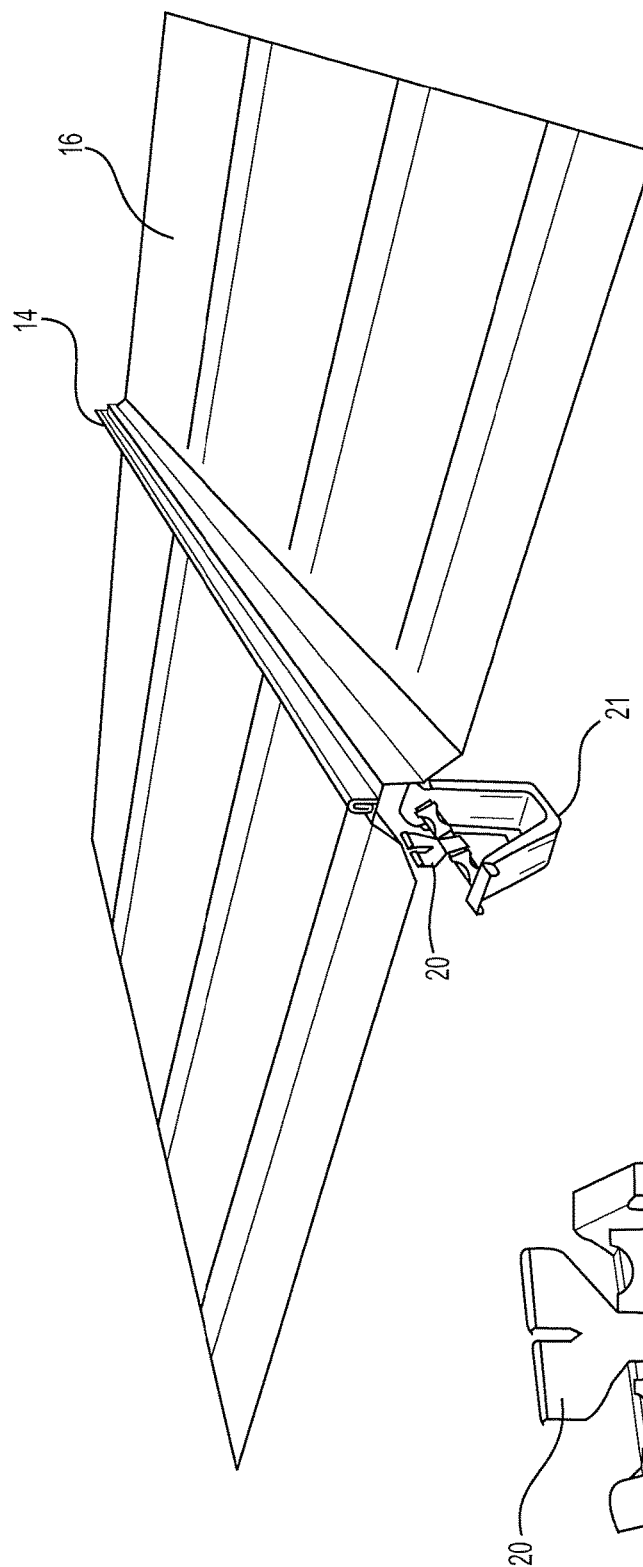

ROOF SYSTEM FOR PRODUCTION OF ELECTRICAL POWER

FIELD OF THE DISCLOSURE

This disclosure relates to thin film photovoltaic roof panels and specifically the application of the panels to a pre-engineered roof system.

BACKGROUND

Photovoltaic manufactures have made solar cells capable of generating electricity, but the mounting of these solar cells to buildings with pre-engineered roofing systems that have limitations on roof loads has at times been problematic. For example, many building owners seeking to install solar cells onto the roofs of their buildings are dismayed to hear that the building was not originally designed to accommodate the load of newly installed solar panels which can add weight in the range of 2-5 pounds per square foot. Current installations of a photovoltaic system over the top off an existing roof, often times requires a professional engineer to certify that the roof can support the increased load.

In addition, fire codes in many jurisdictions require a path to the ridge without requiring the firefighter to cross over photovoltaic systems. These new codes require access along the rakes, valleys and ridge of the roof and the ability to punch a hole in the ridge, to release dangerous gases. So long as a solar panel is receiving sunlight, it is impossible to turn off. During daylight, there can be enough voltage and current to injure or even kill a firefighter who comes in contact with the energized conductors.

The thin film photovoltaic industry has designed photovoltaic cells to be adhered to metal and rubber membranes used in manufacturing roofing materials. Adhering photovoltaic laminates directly to existing roof systems makes it very difficult and at times impossible to service the photovoltaic system, and the roof system without total replacement of each system. In addition, adhering photovoltaic panels directly to the roof system can result in accelerated corrosion of roof components. If a photovoltaic cell on a roof panel malfunctions it will diminish the power of the panels connected to that series. This will drastically reduce the output of the whole system. The wiring together of these thin film cells is critical in the system design. For optimal performance of the photovoltaic system, it must be possible to replace malfunctioning photovoltaic cells, in the same physical location to accommodate wiring logistics. One cannot simply work around a malfunctioning photovoltaic roof panel without rewiring the complete system to even out the number of cells in each series. Scraping off an adhesively adhered photovoltaic cell from a roof panel in a manner so as to reuse the metal panel is also not generally an option as the adhesive powerfully binds the photovoltaic to the roof panel. Alternatively, removing a standard metal roof panel secured in position with concealed fasteners, in order to remove the photovoltaic cell, is not cost effective and generally multiple panels must be removed in order to replace one. Consequently, a system for expedited installation and replacement of roof mounted photovoltaic cells remains a significant need in the industry.

SUMMARY OF THE INVENTION

A standing seam roof is a metal roofing system featuring vertical metal panels running from the ridge of the roof all the way down to the eaves. The upturned edge of a metal panel connecting it to the adjacent panel creates a distinctive vertical line known as a standing seam. A distinctive design feature of a standing seam roof is that there are no exposed screws or fasteners, which could become potential sources of leaks. Standing seam design incorporates hidden or concealed fasteners, which is what makes it more watertight than a similarly-looking ribbed or corrugated metal roofing system.

Disclosed herein is a roof system for production of electrical power secured to a standing seam roof. The roof system preferably comprises a standing seam roof with first and second laterally disposed longitudinally extending corrugations. At least one bracket is secured to each of the first and second laterally disposed corrugations. At least one backer panel extends between and is secured to the brackets. Secured to the backer panel is a thin film solar panel with electrical cable connections running within a cable tray that is integral to the bracket.

An advantage of the system disclosed herein is rapid and secure installation of the system to a standing seam roof and the ability to obscure and route cabling beneath the solar panels and to position the cables off of the metal roof itself.

Another advantage of the system disclosed herein is the use of an arched thin film solar panel and backer panel that facilitates the ready movement of air beneath the backer panels and above the roof thereby providing ventilation and maintaining the temperature in a range that improves solar panel electrical performance and reduces the amount of heat transfer through the roof to the interior of the building structure.

Another advantage of the system disclosed herein is the arched backer panel configuration with associated thin film panel. The arched configuration facilitates the shedding of snow and increases exposure to sunlight as the sun passes overhead thereby improving the delivery of electrical power and the rate of return on the solar panel installation investment.

Various objects, features, aspects and advantages of the disclosed subject matter will become more apparent from the following detailed description of preferred embodiments, along with the accompanying drawings in which like numerals represent like components. The contents of this summary section are provided only as a simplified introduction to the disclosure, and are not intended to be used to limit the scope of the appended claims.

BRIEF DESCRIPTION OF THE DRAWINGS

FIG. 2 is a perspective view of an embodiment of a clip unit;

FIG. 2A is a perspective view of an embodiment of a clip unit disposed beneath a seam joining two adjacent roof panels;

DETAILED DESCRIPTION

Figure 1:
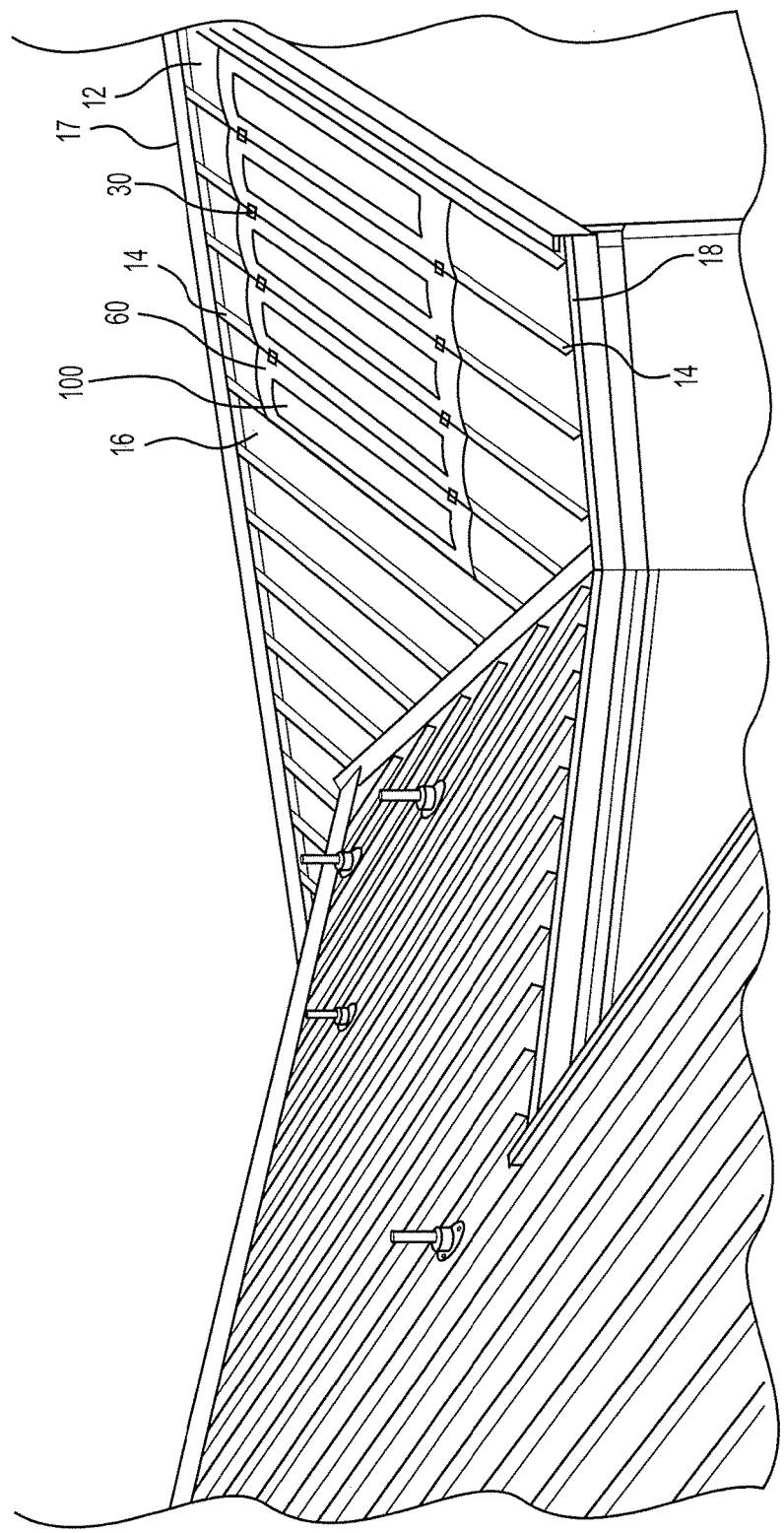
FIG. 1 is a perspective view of an embodiment of a roof mounted solar panel system.
Figure 3A:
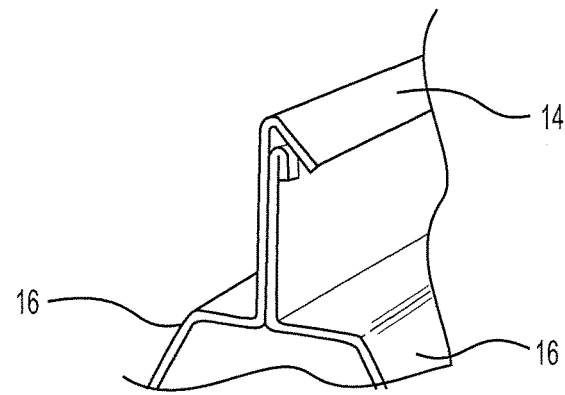
FIG. 3A is a perspective view of a an embodiment of a standing seam prior to initiation of rolling.
Figure 3B:
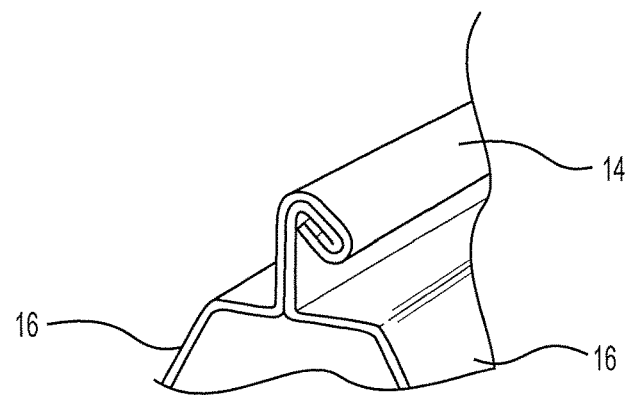
FIG. 3B is a perspective view of an embodiment of a standing seam partially rolled.
Figure 3C:
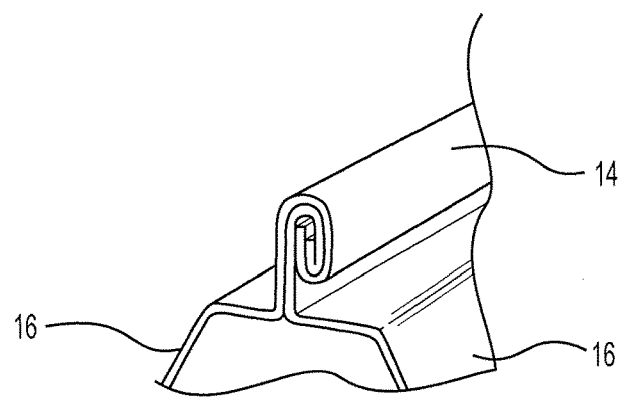
FIG. 3C is a perspective view of an embodiment of a fully rolled standing seam.

Disclosed herein, as shown in FIG. 1 is a roof system for production of electrical power from solar energy using solar panels. The system 10, comprising solar panels 100 is installed on a roof 12 with laterally disposed and longitudinally extending standing seams 14. Standing seam roofs consist of continuous metal panels 16 that run from the ridge 17 of the roof 12 all the way down to the eaves 18. A standing seam roof 12 is a metal roof that fastens to a structure without holes or penetrations and behaves as a single steel membrane to protect the building. As seen in FIG. 2, between the panels 16 are seams 14. The tongues 20 of clip units 21 are inserted between the adjacent panels 16, prior to the rolling of the seam 14, and couple, or connect, the roof panels 16 to a building structural element such as a purlin. Because the clip units 21 and tongues 20 are concealed beneath the roof panels 16, only a smooth continuous seam 14 extending from ridge 17 to eave 18 is seen. The phrase "standing seam" roof originated because the seam is raised or standing, as opposed to flush-mounted. The preferred configuration of a standing seam roof employs a 360 degree Pittsburgh double lock seam, as shown in FIGS. 3A, 3B and 3C, a progressive rolling of the seam 14 with the final 180 degrees field rolled, for superior weather-tight performance. It is the final rolled seam 14, as seen in a typical configuration at FIG. 3C that is used to anchor the solar system 100 to the roof 12 of a structure utilizing the tongue 20 of the clip unit engaged with the rolled seam 14.

Figure 4:
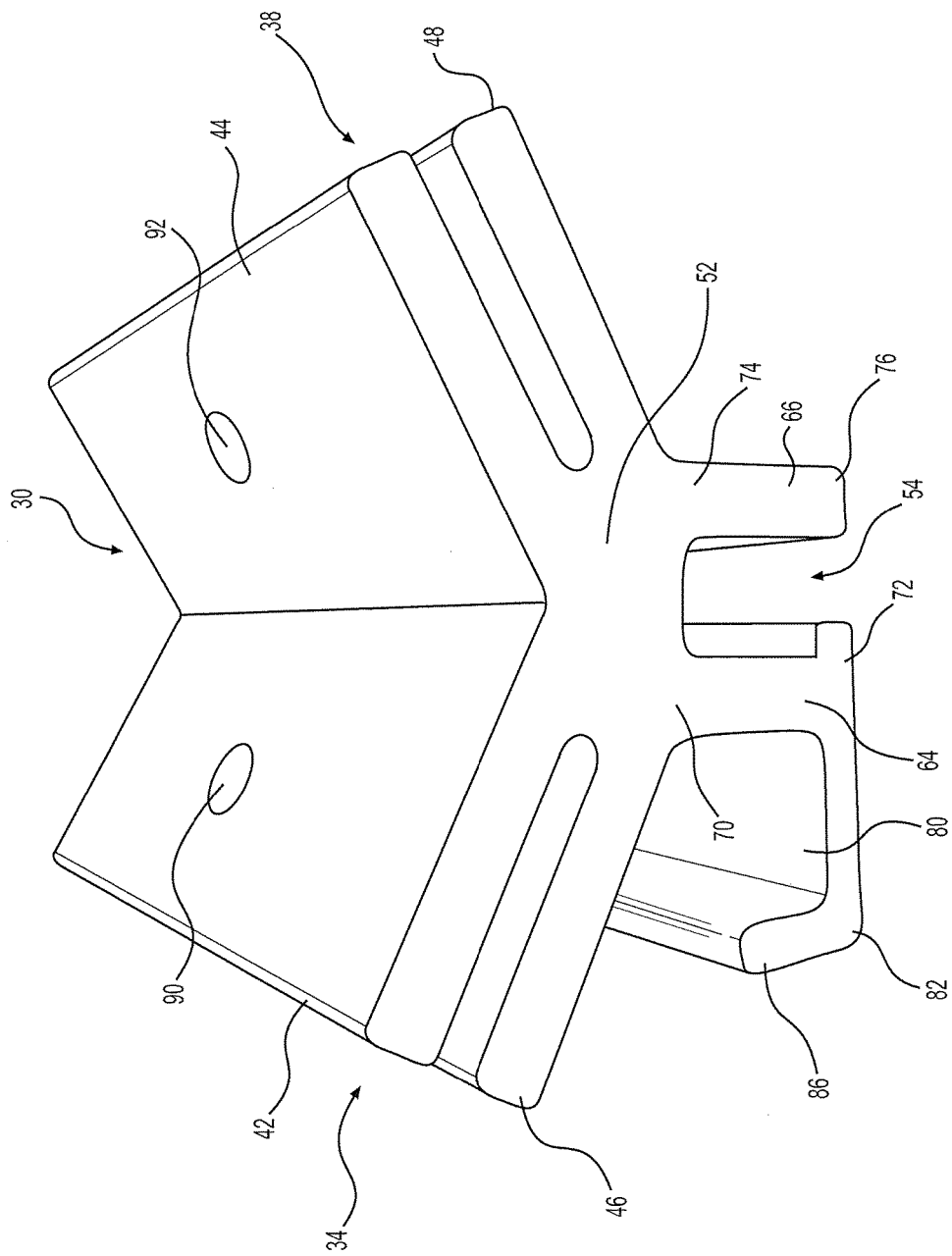
FIG. 4 is a perspective view of an embodiment of the bracket.
Figure 5:
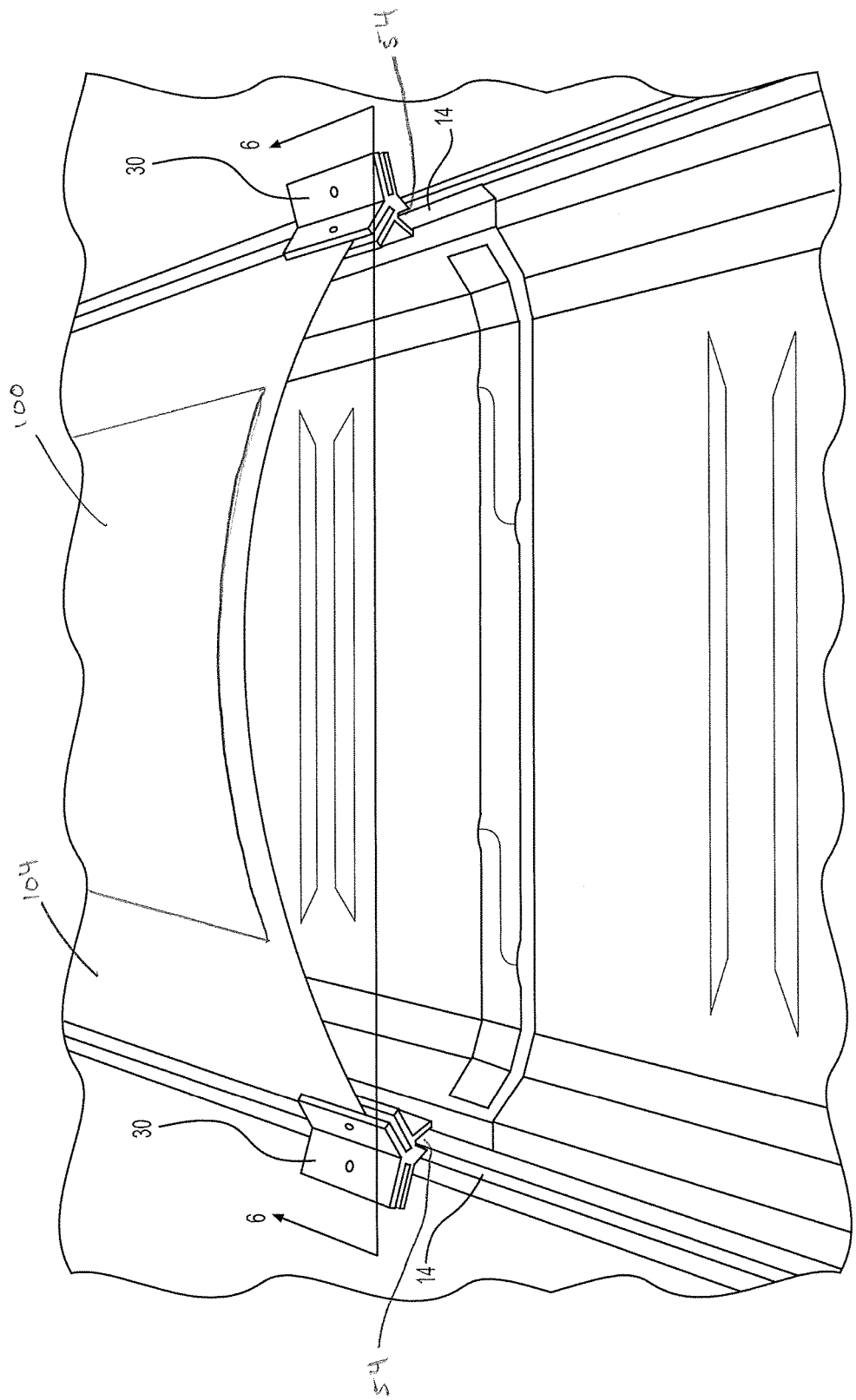
FIG. 5 is a perspective view of an embodiment of brackets mounted to opposed standing seams securing a backer panel and solar panel in position.

As shown in FIG. 4, the roof system 10 utilizes brackets 30 secured to each of the laterally disposed standing seams 14. The bracket 30 comprises two pairs of outwardly extending wing walls 34, 38. Each pair of wing walls are comprised of an upper wing wall 42, 44 and a lower wing wall 46, 48. The upper wing walls 42, 44 of each pair join at a central union 52 atop a channel 54. The bracket channel 54, as depicted in FIGS. 5 and 6 is configured for receiving and mounting onto the longitudinally extending standing seams 14 of the roof.

Figure 6:
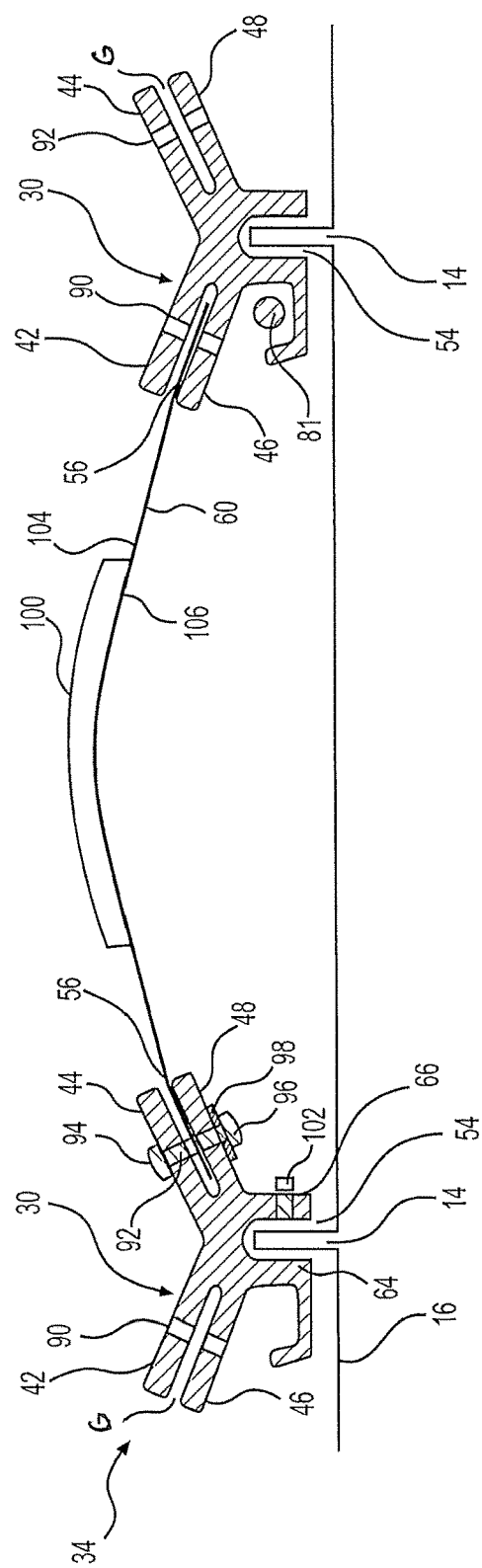
FIG. 6 is a cross section view of an embodiment of the roof mounted solar panel system taken along line 6-6 of FIG. 5.

FIG. 6 reveals that the upper 42, 44 and lower wing wall 46, 48 are uniformly spaced apart and are configured for receiving therebetween at least a portion of an edge 56 of the backer panel 60. The upper wing walls 42, 44 on each pair 34, 38 are spaced apart from the lower wing walls 46, 48 with a gap G in the range of from about 0.15 to 0.30 inches. This gap G being sufficient to accommodate a portion of the edge 56 of a wide variety of backer panel 60 widths but not so wide as to inhibit the capacity of the bracket 30 to properly restrain the edge 56 of the backer panel 60 in position.

FIG. 6 also reveals that the upper wing walls 42, 44 of the bracket 30 extend fixedly outwardly and are separated by an angle in the range of from about 120 to 150 degrees. The 120 to 150 degree wing wall 34, 38 angular span facilitates the formation of the arcuate or arched configuration of the backer panel 60 when a portion of the edge 56 of the backer panel 60 is inserted into the gap G of a bracket 30 mounted to the seams 14 on opposed sides of a roof panel 16.

As seen in FIGS. 4 and 6, the bracket channel 54, as noted above, is comprised of first and second laterally disposed wall members 64, 66. The first laterally disposed wall member 64 is further comprised of an upper end 70 and a lower end 72. The second laterally disposed wall member 66 is further comprised of an upper end 74 and a lower end 76.

A cable tray floor 80 extends laterally outwardly from the lower end 72 of the first wall member 64 and terminates at an outer edge 82. Extending upwardly from the outer edge 82 of the cable tray floor 80 is a cable tray retaining wall 86. The cable tray floor 80 and cable tray retaining wall 86 provide a path for routing of electrical power delivery cables 81 emanating from the solar panels 100 mounted to the backer panels 60. These bracket 30 structural features facilitate the routing of cabling from the solar collectors to the appropriate power delivery connection point without the need to lay cables onto the metal roof itself.

Both pairs of the upper and lower wing walls 34, 38 include at least one through hole 90, 92. In a use configuration, a fastener 94 passes into and through the hole in the upper wing walls 90, 92 through the backer panel 60 and then through the lower wing wall where it is preferably secured in position by retaining means such as a nut 96 and a washer 98. Because the bracket 30 and other roof system components for production of electrical power from solar energy are exposed to intense sunlight, moisture, air pollutants and may be exposed to numerous freeze/thaw cycles and high wind loading they are preferably fabricated from durable and high strength materials such as engineered plastics, aluminum or ceramics.

In order for the brackets 30, and in turn the solar power system 100, to remain securely attached to the standing seams 14 one or more threaded holes are preferably fabricated in either the first, the second, or both laterally disposed wall members 64, 66 allowing a fastener 102 to pass through the wall members and to engage the standing seam 14 to lock the bracket 30 into position onto the roof. Because standing seam roofs are purposefully rolled with the Pittsburgh double lock to prevent moisture intrusion into the seam the fastening hardware preferably does not pass through the seam 14 but engages the outer surface of the seam creating a tight friction fit between the bracket 30 and the standing seam 14 thereby minimizing the potential for liftoff of the system 100 due to, for example, high wind loads.

As previously discussed the roof system components for production of electrical power from solar energy includes at least one and preferably multiple backer panels 60. An exemplary backer panel is fabricated from 26 gauge aluminum or galvanized steel. Other backer panel materials and thicknesses may be employed to satisfy the particular needs of the application; however, flexure of the backer panel 60 by manual manipulation is beneficial to the system configuration. The backer panels 60 include an upper surface 104 and a lower surface 106 and extend between each bracket.

The edges 56 of the backer panels 60, in a use configuration, are secured within the gap 45 between the upper and lower wing walls 34, 38 on each side of the bracket 30 and due to the upwardly extending cant of the wing wall pairs the backer panels 60 maintain an arched configuration as they extend between the standing seams 14 of the roof 12. This arched configuration is beneficial in that it assists in the shedding of snow that may fall atop the panel. Shedding of snow is critical to allow sunlight to fall upon the surface of the solar panel system 10. Moreover, the arched backer panel facilitates the movement of air beneath the backer panel 60 and the roof 12 of the structure thereby providing a natural mechanism for heat transfer away from the building and the backer panel. Natural convection heat transfer beneath the backer panels and over the surface of the roof reduces, relative to flat solar panels mounted to the roof, the amount of heat loading on a building since a portion of the heat is carried away with movement of air beneath the backer panel.

As shown in FIG. 6 a thin film solar panel 100 is secured to the upper surface 104 of the curved backer panels 60. The thin film solar panels 100 are light in weight and do not adversely affect the curvature of the backer panel 60 that is held in position between the brackets 30 and secured to the standing seams 14. Exemplary thin film solar panels 100 for the system 10 disclosed herein are those offered by Global Solar® and Dumont Power. The solar panels 100 in a use configuration are secured to the upper surface 104 of the backer panel 60 with an all-weather adhesive. A properly secured solar panel 100 will limit the intrusion of moisture between the solar panel 100 and the backer panel. Intrusion of moisture between these components can result in premature failure of the solar panel 100. A less desirable but functional alternative to the use of adhesives is the utilization of mechanical fasteners. Mechanical fasteners are less capable of maintaining a moisture free interface between the back of the solar panel and the upper surface of the backer panel which as previously noted can lead to premature failure of the roof based solar panels.

Although the invention has been described above with reference to one or more preferred embodiments, it will be appreciated that various changes or modifications may be made without departing from the scope of the invention as defined in the appended claims.

I claim:

1. A roof system for production of electrical power from solar energy, the roof system comprising:
   a roof with at least two laterally disposed longitudinally extending standing seams;
   a separate unibody bracket secured to each of the at least two laterally disposed standing seams, each bracket further comprising a channel with first and second laterally disposed walls configured to closely straddle one of the standing seams, the first laterally disposed wall member including an upper end, a lower end and a cable tray floor that extends laterally outwardly from the lower end of the first wall member, the cable tray floor terminating at an outer edge, wherein a cable tray retaining wall extends upwardly from the outer edge of the cable tray floor;
   at least one backer panel with an upper surface and a lower surface, the at least one backer panel extending between and secured to the at least one bracket per seam forming an arch shaped backer panel configuration; and
   a thin film solar panel secured to the upper surface of the at least one arch shaped backer panel.

2. The roof system of claim 1, wherein the bracket further comprises two pairs of outwardly extending wing walls.

3. The roof system of claim 2, wherein each pair of wing walls are comprised of an upper wing wall and a lower wing wall.

4. The roof system of claim 3, wherein the upper wing walls of each pair join at a union atop a channel configured for receiving the longitudinally extending standing seams.

5. The roof system of claim 4, wherein the upper and lower wing walls are uniformly spaced apart and are configured for receiving therebetween at least a portion of an edge of the backer panel.

6. The roof system of claim 5, wherein the upper wing wall on each pair is spaced apart from the lower wing wall in the range of from about 0.15 to 0.75 inches.

7. The roof system of claim 6, wherein the upper wing walls extend outwardly and are separated by an angle in the range of from about 120 to 150 degrees.

8. The roof system of claim 5, wherein the upper and lower wing walls each include at least one through hole.

9. The roof system of claim 8, wherein a fastener passes into and through the at least one hole in the upper wing wall, through the backer panel and then through the lower wing wall.

10. The roof system of claim 1, wherein the at least one bracket is fabricated from a group consisting of engineered plastic, aluminum and ceramic.

11. A roof solar panel system for production of electrical power, the system comprising:
    a standing seam roof with first and second laterally disposed longitudinally extending corrugations;
    at least one unibody bracket secured to each of the first and second laterally disposed corrugations, the bracket further comprising a channel with first and second laterally disposed walls configured to closely straddle one of the corrugations, the first laterally disposed wall member including an upper end, a lower end and a cable tray floor that extends laterally outwardly from the lower end of the first wall member, the cable tray floor terminating at an outer edge, wherein a cable tray retaining wall extends upwardly from the outer edge of the cable tray floor;
    at least one backer panel with an upper surface and a lower surface, the at least one backer panel extending between and secured to each of the brackets; and
    a thin film solar panel secured to the upper surface of the at least one backer panel.

12. The roof solar panel system of claim 11, wherein the backer panel in a use configuration is arcuately shaped.

13. The roof solar panel system of claim 11, wherein the thin film solar panel is secured to the backer with an adhesive.

14. The roof solar panel system of claim 11, wherein the thin film solar panel is secured to the backer panel with threaded fasteners.

15. The roof solar panel system of claim 11, wherein the backer panel is comprised of aluminum with a thickness no greater than 0.25 inches.

16. The roof solar panel system of claim 11, wherein the bracket further comprises at least two pairs of outwardly extending wing walls.

17. The roof solar panel system of claim 16, wherein each pair of wing walls are comprised of an upper wing wall and a lower wing wall.

18. The roof solar panel system of claim 17, wherein the upper wing walls of each pair join at a union atop a channel configured for receiving the longitudinally extending standing seams.

19. The roof solar panel system of claim 18, wherein the upper and lower wing walls are uniformly spaced apart and are configured for receiving therebetween at least a portion of an edge of the backer panel.

20. The roof solar panel system of claim 18, wherein the upper wing walls extend outwardly and are separated by an angle in the range of from about 120 to 150 degrees.

21. The roof solar panel system of claim 12, wherein the arcuate configuration of the backer panel facilitates the movement of air between the backer panel and the roof.

22. The roof solar panel system of claim 21, wherein movement of air between the backer panel and the roof facilitates the transfer of heat away from the roof and the backer panels.

23. A bracketing system for securing a solar panel to a standing seam roof, the bracketing system comprising:
- at least one unibody bracket secured to each of two laterally disposed longitudinally extending standing seams, the bracket further comprising a channel with first and second laterally disposed walls for straddling one of the standing seams, the first laterally disposed wall member is further comprised of an upper end, a lower end and a cable tray floor that extends laterally outwardly from the lower end of the first wall member, the cable tray floor terminating at an outer edge, wherein a cable tray retaining wall extends upwardly from the outer edge of the cable tray floor;
- at least one flexible backer panel with an upper surface and a lower surface, the at least one backer panel extending between and secured to each bracket forming an arcuately shaped backer panel configuration; and
- a thin film solar panel secured to the upper surface of the at least one arcuately shaped backer panel.

24. The roof solar panel bracketing system of claim 23, wherein the bracket further comprises two pairs of outwardly extending wing walls, the wing walls comprised of an upper wing wall and a lower wing wall, the wing walls of each pair joined at a union atop a channel configured for receiving the longitudinally extending standing seams, and the upper and lower wing walls uniformly spaced apart from one another and configured for receiving therebetween a portion of an edge of the backer panel, the upper wing walls extending outwardly and separated by an angle in the range of from about 120 to 150 degrees.

* * * * *